(12) United States Patent
Timmermans

(10) Patent No.: US 12,098,067 B2
(45) Date of Patent: Sep. 24, 2024

(54) MOBILE REFRIGERATED BAR UNIT

(71) Applicant: Filip Gaston Robert Timmermans, Johannesburg (ZA)

(72) Inventor: Filip Gaston Robert Timmermans, Johannesburg (ZA)

(73) Assignee: Filip Gaston Robert Timmermans, Johannesburg (ZA)

( * ) Notice: Subject to any disclaimer, the term of this patent is extended or adjusted under 35 U.S.C. 154(b) by 0 days.

(21) Appl. No.: 18/290,115

(22) PCT Filed: May 11, 2022

(86) PCT No.: PCT/ZA2022/050019
§ 371 (c)(1),
(2) Date: Nov. 9, 2023

(87) PCT Pub. No.: WO2022/241487
PCT Pub. Date: Nov. 17, 2022

(65) Prior Publication Data
US 2024/0270561 A1    Aug. 15, 2024

(30) Foreign Application Priority Data
May 11, 2021    (ZA) .................................. 2021/03162

(51) Int. Cl.
*B67D 1/08*    (2006.01)
*B67D 1/04*    (2006.01)
*B67D 1/12*    (2006.01)

(52) U.S. Cl.
CPC ............ *B67D 1/0864* (2013.01); *B67D 1/04* (2013.01); *B67D 1/1281* (2013.01); *B67D 2210/00136* (2013.01)

(58) Field of Classification Search
CPC ...... B67D 1/0864; B67D 1/04; B67D 1/1281; B67D 2210/00136
See application file for complete search history.

(56) References Cited

U.S. PATENT DOCUMENTS 5,079,927 A    1/1992  Rodino et al.
10,112,522 B2 *  10/2018  Tollefson ............... A23G 9/288
(Continued)

FOREIGN PATENT DOCUMENTS

CA    2414870 A1    6/2004
CA    2612825 A1    5/2009
(Continued)

OTHER PUBLICATIONS

Written Opinion and International Preliminary Report of International Application No. ZA2022050019 filed May 11, 2022.

*Primary Examiner* — Jeremy Carroll
(74) *Attorney, Agent, or Firm* — Lando & Anastasi, LLP

(57) ABSTRACT

A mobile refrigeration unit, including: a container for the storage of beverages; a temperature conditioning means for maintaining a pre-set ambient temperature inside the container, and taking the form of a split system comprising a compressor, a condenser a thermostat, and an evaporator blower. The mobile refrigeration unit also includes a secondary temperature control mechanism for controlling the temperature of products to be dispensed; a pressure system, for controlling the water level in the secondary temperature control mechanism, and a series of refrigeration coils through which products are pumped, and the temperature thereof measured by the thermostat. The combination of the temperature conditioning means and the secondary temperature control mechanism together defining a split cooling system.

20 Claims, 11 Drawing Sheets

(56) References Cited

U.S. PATENT DOCUMENTS

| | | | | |
|---|---|---|---|---|
| 10,980,247 B2* | 4/2021 | Tollefson | .................. | A23G 9/28 |
| 2006/0273604 A1* | 12/2006 | Luthe | ..................... | B62J 17/083 |
| | | | | 296/22 |
| 2008/0179346 A1* | 7/2008 | Downey | .................. | A23G 9/28 |
| | | | | 62/342 |
| 2009/0078724 A1* | 3/2009 | Lamb | .................... | B60P 3/0257 |
| | | | | 222/113 |
| 2014/0027471 A1* | 1/2014 | Tollefson | .............. | B60P 3/0257 |
| | | | | 296/22 |
| 2014/0239020 A1* | 8/2014 | Lamb | .................. | B67D 1/0889 |
| | | | | 222/608 |
| 2016/0044936 A1* | 2/2016 | Tollefson | .............. | B60P 3/0257 |
| | | | | 222/144.5 |
| 2020/0361758 A1* | 11/2020 | Fantappié | ............ | B67D 1/0895 |
| 2022/0024748 A1* | 1/2022 | Fantappie | ............ | B67D 1/0074 |

FOREIGN PATENT DOCUMENTS

| | | | |
|---|---|---|---|
| WO | 2016164879 A1 | 10/2016 | |
| WO | 2017155374 A2 | 9/2017 | |

* cited by examiner

MOBILE REFRIGERATED BAR UNIT

FIELD OF THE INVENTION

The invention is in the field of mobile refrigeration bar units.

BACKGROUND TO THE INVENTION

Typically, various mobile bar units are available for the storage, chilling and dispensing of liquids, namely beverages.

These mobile bar units may be in various sizes and generally comprise of a refrigerator unit and a beverage chiller to control the cooling.

A number of limitations are present in current technologies, including but not limited to the restriction of mobility of the refrigeration unit, in difficult terrain; limitations of use; energy sources required to power and chill the mobile refrigerated bar unit; the maintenance of a standard and optimum temperature for storage and dispensing and, therefore, the destruction of beverages in the mobile refrigerated bar unit.

The inventor believes that the new invention improves on current mobile bar units.

SUMMARY OF THE INVENTION

According to an aspect of the invention there is provided a mobile refrigeration unit, including a container for storage of products, a temperature conditioning means assisting in maintaining a pre-set ambient temperature inside the container, a secondary temperature control mechanism for control of the temperature of products to be dispensed; and a pressure system, the pressure system controlling the water level in the secondary temperature control mechanism.

The container may be in the form of refrigeration container, of a required shape suitable for keeping products at a cool temperature.

The container may be attachable to a trailer. The trailer may be configured to transport the mobile refrigeration unit to various destinations, of various terrains.

The container may define a door for access by a user, to access the split cooling system and to load and unload the container with products.

The container may define at least one further sealable aperture, for access to the cooling system or the split cooling system.

The container may be manufactured to a size adequate for the needs of the user. The container may be manufactured from insulated panels, the panels may be of a thickness of approximately 7 (seven) centimetres.

The container may store various products, namely beverages. The beverages may be stored in kegs in the container.

The mobile refrigeration unit may be powered by various means. The mobile refrigeration unit may be powered by solar power. The mobile refrigeration unit may be powered by battery. The mobile refrigeration unit may be powered by a generator/inverter. The mobile refrigeration unit may be powered by an electrical power point.

The container may define various securing means to secure the storage means for products within the container, for safe transport thereof.

The container may be configured to be temperature controlled by the temperature conditioning means.

The temperature conditioning means may assist in setting a temperature at a selected temperature inside the container, thereby allowing the stored products to be cooled during use and prior to use.

The temperature conditioning means may assist in maintaining the temperature of the container at a pre-set temperature, notwithstanding the temperature outside of the container.

The temperature conditioning means may set the temperature at a temperature below approximately 15 (fifteen) degrees Celsius. Optimally, the temperature conditioning means may set the temperature at 6 (six) degrees Celsius.

The temperature conditioning means may include a split system. The split system may include a compressor, condenser and thermostat mounted on the outside of the container, which are in communication with an evaporator blower which may be mounted on the inside of the container.

In an embodiment of the invention, the secondary temperature control mechanism may include a secondary split system. The secondary split system may include a compressor, condenser and thermostat mounted on the outside of the container, which are in communication with a chilling unit mounted on the inside of the container.

The chilling unit may include a water tank which is located on the inside of the container.

The water tank may include at least one refrigeration coil through which products are pumped and the temperature thereof measured by the thermostat which may assist in controlling and maintaining the temperature of the cold water in the water tank.

In an embodiment of the invention, there may be approximately 8 (eight) coils through which various beverages are pumped. The refrigeration coils may be approximately 9.5 (nine and a half)-14 (fourteen) meters in length. The refrigeration coils may be manufactured from stainless steel.

The beverages may run from beverage storage means, through beverage dispensing lines and run through the refrigeration coils, the beverages which may be cooled to a temperature of approximately 2 (two)-3 (three) degrees Celsius when flowing through the refrigeration coils.

The thermostat controls the ice bank within the water tank, monitoring the temperature of the water and assisting in ensuring the water to be at a temperature just above freezing, and avoiding the formation of an ice bank around the coils.

The water tank also includes a water pump which may be utilised to agitate the water in the water tank, to avoid the freezing of the water around the refrigeration coils.

The water pump may further assist with circulating water along the tap lines extending from the coils.

Water from the water tank may be pumped from the water tank, adjacent to the tap lines, thereby maintaining the temperature of the beverages before dispensing.

The combination of the control of the ambient temperature in the container and the temperature control mechanism may assist in alleviating strain on the secondary split system by breaking down the ice bank due to high volumes of high temperature liquid to pass, and may assist in ensuring that the beverages being dispensed remain at the same temperature through use.

The control of the ambient temperature by the temperature conditioning means and the temperature of the product may assist in reducing waste of stored product and may lengthen the life span of the product.

The water tank may be configured to hold approximately 50 litres of water.

The water in the water tank may be drained from the water tank to allow for the transport of the mobile refrigeration unit and/or maintenance of the secondary split cooling system.

The pressure system may be powered by any sufficient means. The pressure system may be powered by electrical means. The pressure system may be powered by compressed gas, namely Carbon Dioxide gas. The pressure system may be air controlled.

The pressure system may include at least one gas tank. In an embodiment of the invention, the gas tank is located on the outside of the container.

The pressure system may include at least one pressure operated pump. Typically, the pressure system may include two pressure operated pumps.

The pressure system includes valves which control the gas expelled from the pumps.

The valves of the pressure system may be located on the inside of the container.

The pressure system may include pipes extending from the pumps.

A first pump may be enabled to pump water from the water tank, to a storage tank remote the water tank. The remote storage tank may typically be located adjacent to the water tank.

Manipulation of the valve of the first pump from a first closed position to a second. open position, may activate the pump, thereby pumping water from the water tank to the storage tank. Manipulation of the valve of the first pump from a second open position to a first closed position, may stop pumping of the water.

Water may be stored in the storage tank during transport of the mobile refrigeration unit.

By removing the water from the water tank, the secondary split system may not be needed to be removed from the mobile refrigeration unit for maintenance and may assist in preventing of the freezing of water in the water tank. The removal of the water from the water tank may assist in preventing damages to the pump and other equipment while in transit and, furthermore, preventing spillage of water from the water tank. Storing the water in a storage tank inside the refrigerated container allows the water to keep at a low temperature for immediate use at the next location.

As second pump may be enabled to pump water from the storage tank to the water tank.

Manipulation of the valve of the second pump, from a first closed position to a second open position, may activate the pump, thereby assisting in pumping water from the storage tank to the water tank, for cooling. Manipulation of the valve of the second pump from a second open position to a first closed position, may stop pumping of water. The water tank has an overflow positioned at the maximum level of the water tank flowing back into the storage tank.

Pumping of water from the storage tank to the water tank may be after transport of the mobile refrigeration unit, for cooling of the water by the split system, and the subsequent cooling of the products.

The mobile refrigerated bar unit may include at least 2 dispensing means mounted directly on the outside wall of the container and connected to the refrigeration coils passing through the water tank, via beverage dispensing lines, from the storage means within which product is stored on the inside of the container.

The mobile refrigeration unit may include between 2 to 16 dispensing means mounted on the outside wall of the container.

One storage means, typically in the form of a keg, may be connected and supply two or more dispensing means.

The dispensing means may be in the form of taps.

The dispensing means may be in the form of bottle filling units.

The mobile refrigerated bar unit may include a plurality of detectors, to assist in detecting the foam on beverages stored in the container. The detectors may include foam on beer detectors. The detectors may be positioned internal the container. The detector may be secured on the inside wall of the container.

The mobile refrigerated bar unit may include regulators which control and manage dispensing pressure of the product. The regulators may include carbon dioxide regulators.

The carbon dioxide regulator may be associated with each beverage dispensing line and may assist in managing and controlling the dispensing pressure from the storage means, through the beverage dispensing line and the refrigeration coils, to the dispenser.

The mobile refrigerated bar unit may include a software controlled Dispense Monitoring System including flow meters, temperature meters and cameras. This monitoring system may include integration into a POS (point of sale) system for the monitoring of the sales versus usage. The monitoring system may be accessible from a remote location via a mobile application.

The mobile refrigerated bar unit may include a carbonation unit, which may assist in carbonating a select beverage. Carbonated beverages may be any one or more of the group including sparkling wine, hard seltzer, soft drinks and the like.

The carbonation unit may be associated with one or more beverage dispensing lines.

The carbonation unit may include a tank, which may typically be manufactured of stainless steel, and configured to handle high pressures.

The carbonation unit may be connected to carbon dioxide bottle and a regulator, which may regulate the pressure forms inside the tank.

The beverage to be carbonated may be fed into the tank, and the carbon dioxide is introduced to produce a carbonated beverage.

The tank of the carbonation unit shall be fed into a beverage dispensing line and the beverage cooled, as per the normal course.

Typically the pressure in the carbonation unit may be maintained between 6 and 8 bar.

According to an aspect of the invention there is provided a mobile refrigeration unit, including a container for storage of products, a temperature conditioning means assisting in maintaining a pre-set ambient temperature inside the container, a secondary temperature control mechanism for control of the temperature of products to be dispensed; a pressure system, the pressure system controlling the water level in the secondary temperature control mechanism and a regulator which is configured to manage and control the pressure of dispensed product.

According to an aspect of the invention there is provided a mobile refrigeration unit, including a container for storage of products, a temperature conditioning means assisting in maintaining a pre-set ambient temperature inside the container, a secondary temperature control mechanism for control of the temperature of dispensed products; a pressure system, the pressure system controlling the water in the secondary temperature control mechanism; a regulator which is configured to manage and control the pressure of dispensed product and a carbonator configured to carbonate beverages in the mobile refrigeration unit.

According to an aspect of the invention there is a system for the storage and cooling of products in a mobile refrigeration unit including a container for storage of the products, a temperature conditioning means assisting in maintaining a pre-set ambient temperature inside the container, a secondary temperature control mechanism for control of the temperature of products to be dispensed; a pressure system, the pressure system controlling the water in the temperature control mechanism; a regulator which is configured to manage and control the pressure of dispensed product.

The container may be in the form of refrigeration container, of a required shape suitable for keeping products at a cool temperature.

The container may be attachable to a trailer. The trailer may be configured to transport the mobile refrigeration unit to various destinations, of various terrains.

The container may define a door for access by a user, to access the split cooling system and to load and unload the container with products.

The container may define at least one further sealable aperture, for access to the cooling system or the split cooling system.

The container may be manufactured to a size adequate for the needs of the user. The container may be manufactured from insulated panels, the panels may be of a thickness of approximately 7 cm.

The container may store various products, namely beverages. The beverages may be stored in kegs in the container.

The mobile refrigeration unit may be powered by various means. The mobile refrigeration unit may be powered by solar power. The mobile refrigeration unit may be powered by battery. The mobile refrigeration unit may be powered by a generator/inverter. The mobile refrigeration unit may be powered by an electrical power point.

The container may define various securing means to secure the storage means for products within the container, for safe transport thereof.

The container may be configured to be temperature controlled by a temperature conditioning means.

The temperature conditioning means may assist in setting a temperature at a selected temperature inside the container, thereby allowing the stored products to be cooled during use and prior to use.

The temperature conditioning means may assist in maintaining the temperature of the container at a pre-set temperature, notwithstanding the temperature outside of the container.

The temperature conditioning means may set the temperature at a temperature below approximately 15 (fifteen) degrees Celsius. Optimally, the temperature conditioning means may set the temperature at 6 (six) degrees Celsius.

The temperature conditioning means may include a split system. The split system may include a compressor, condenser and thermostat mounted on the outside of the container, which are in communication with an evaporator blower which may be mounted on the inside of the container.

The secondary temperature control mechanism may include a secondary split system. The secondary split system may include a compressor, condenser and thermostat mounted on the outside of the container, which are in communication with a chilling unit mounted on the inside of the container. Preferably, the chilling unit includes at least one cooling coil.

The chilling unit may include a water tank which is located on the inside of the container.

The water tank may include at least one refrigeration coil through which products are pumped and the temperature thereof measured by the thermostat which may assist in controlling and maintaining the temperature of the cold water in the water tank.

In an embodiment of the invention, there may be approximately 8 (eight) coils through which various beverages are pumped. The refrigeration coils may be approximately 9.5 (nine and a half)-14 (fourteen) meters in length. The refrigeration coils may be manufactured from stainless steel.

The beverages may run from beverage storage means, through beverage dispensing lines and run through the refrigeration coils, the beverages which may be cooled to a temperature of approximately 2 (two)-3 (three) degrees Celsius when flowing through the refrigeration coils.

The thermostat controls the ice bank within the water tank, monitoring the temperature of the water and assisting in ensuring the water to be at a temperature just above freezing, and avoiding the formation of an ice bank around the coils.

The water tank also includes a water pump which may be utilised to agitate the water in the water tank, to avoid the freezing of the water around the refrigeration coils.

The water pump may further assist with circulating water along the tap lines extending from the coils.

Water from the water tank may be pumped from the water tank, adjacent to the tap lines, thereby maintaining the temperature of the beverages before dispensing.

The combination of the control of the ambient temperature in the container and the secondary temperature control mechanism may assist in alleviating strain on the secondary split system by breaking down the ice bank due to high volumes of high temperature liquid to pass, and may assist in ensuring that the beverages being dispensed remain at the same temperature through use.

The control of the ambient temperature by the temperature conditioning means and the temperature of the. product may assist in reducing waste of stored product and may lengthen the life span of the product.

The water tank may be configured to hold approximately 50 litres of water.

The water in the water tank may be drained from the water tank to allow for the transport of the mobile refrigeration unit and/or maintenance of the secondary split cooling system.

The pressure system may be powered by any sufficient means. The pressure system may be powered by electrical means. The pressure system may be powered by compressed gas, namely Carbon Dioxide gas. The pressure system may be air controlled.

The pressure system may include at least one gas tank. In an embodiment of the invention, the gas tank is located on the outside of the container.

The pressure system may include at least one pressure operated pump. Typically, the pressure system may include two pressure operated pumps.

The pressure system includes valves which control the gas expelled from the pumps.

The valves of the pressure system may be located on the inside of the container.

The pressure system may include pipes extending from the pumps.

A first pump may be enabled to pump water from the water tank, to a storage tank remote the water tank. The remote storage tank may typically be located adjacent to the water tank.

Manipulation of the valve of the first pump from a first closed position to a second open position, may activate the pump, thereby pumping water from the water tank to the storage tank. Manipulation of the valve of the first pump from a second open position to a first closed position, may stop pumping of the water.

Water may be stored in the storage tank during transport of the mobile refrigeration unit.

By removing the water from the water tank, the secondary split system may not be needed to be removed from the mobile refrigeration unit for maintenance and may assist in preventing of the freezing of water in the water tank. The removal of the water from the water tank may assist in preventing damages to the pump and other equipment while in transit and, furthermore, preventing spillage of water from the water tank. Storing the water in a storage tank inside the refrigerated container allows the water to keep at a low temperature for immediate use at the next location.

As second pump may be enabled to pump water from the storage tank to the water tank.

Manipulation of the valve of the second pump, from a first closed position to a second open position, may activate the pump, thereby assisting in pumping water from the storage tank to the water tank, for cooling. Manipulation of the valve of the second pump from a second open position to a first closed position, may stop pumping of water. The water tank has an overflow positioned at the maximum level of the water tank flowing back to the storage tank.

Pumping of water from the storage tank to the water tank may be after transport of the mobile refrigeration unit, for cooling of the water by the split system, and the subsequent cooling of the products.

The mobile refrigerated bar unit may include at least 2 dispensing means mounted directly on the outside wall of the container and connected to the refrigeration coils passing through the water tank, via beverage dispensing lines, from the storage means within which product is stored on the inside of the container.

The mobile refrigerated bar unit may include between 2 to 16 dispensing means mounted on the outside wall of the container.

The dispensing means may be in the form of taps.

The dispensing means may be in the form of bottle filling units.

The mobile refrigerated bar unit may include a plurality of detectors, to assist in detecting the foam on beverages stored in the container. The detectors may include foam on beer detectors. The detectors may be positioned internal the container. The detector may be secured on the inside wall of the container.

The mobile refrigeration unit may include regulators which control and manage dispensing pressure of the product. The regulators may include carbon dioxide regulators.

The carbon dioxide regulator may associated with each beverage dispensing line and may assist in managing and controlling the dispensing pressure from the storage means, through the beverage dispensing line and the refrigeration coils, to the dispenser.

The mobile refrigerated bar unit may include a software controlled Dispense Monitoring System including flow meters, temperature meters and cameras. This monitoring system may include integration into a POS (point of sale) system for the monitoring of the sales versus usage. The monitoring system may be accessible from a remote location via a mobile application.

The mobile refrigerated bar. unit may include a carbonation unit, which may assist in carbonating a select beverage. Carbonated beverages may be any one or more of the group including sparkling wine, hard seltzer, soft drinks and the like.

The carbonation unit may be associated with one or more beverage dispensing lines.

The carbonation unit may include a tank, which may typically be manufactured of stainless steel, and configured to handle high pressures.

The carbonation unit may be connected to carbon dioxide bottle and a regulator, which may regulate the pressure forms inside the tank.

The beverage to be carbonated may be fed into the tank, and the carbon dioxide is introduced to produce a carbonated beverage.

The tank of the carbonation unit shall be fed into a beverage dispensing line and the beverage cooled, as per the normal course.

Typically the pressure in the carbonation unit may be maintained between 6 and 8 bar.

The inventor believes that the above mobile refrigerated bar unit adequately addresses the shortcomings of previous mobile bar units.

DESCRIPTION OF THE DRAWINGS

The mobile refrigeration unit will now be described in terms of the following non-limiting drawings:—

Figure 1:
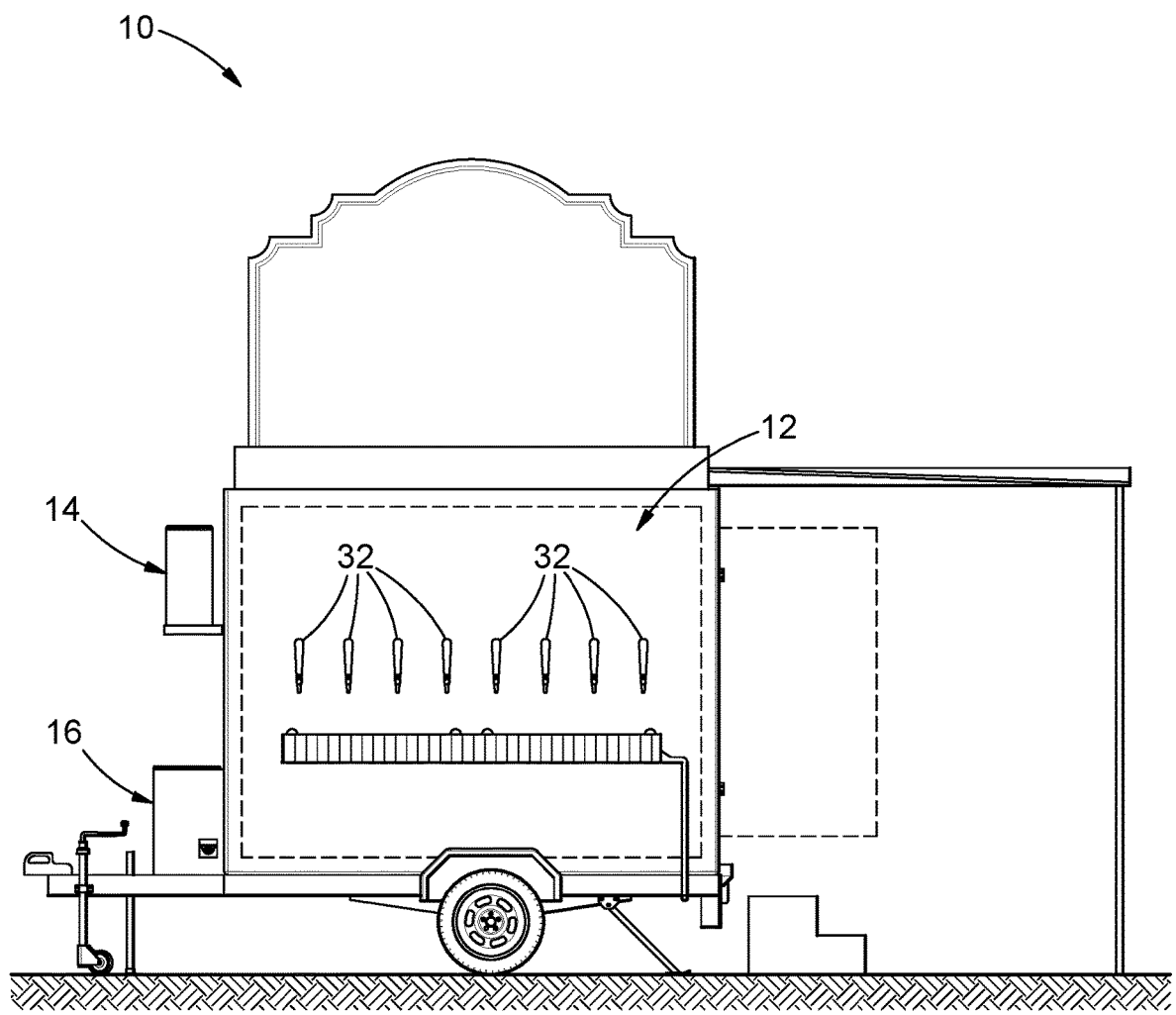
FIG. 1 shows a side view of an embodiment of the mobile refrigerated bar unit.
Figure 2:
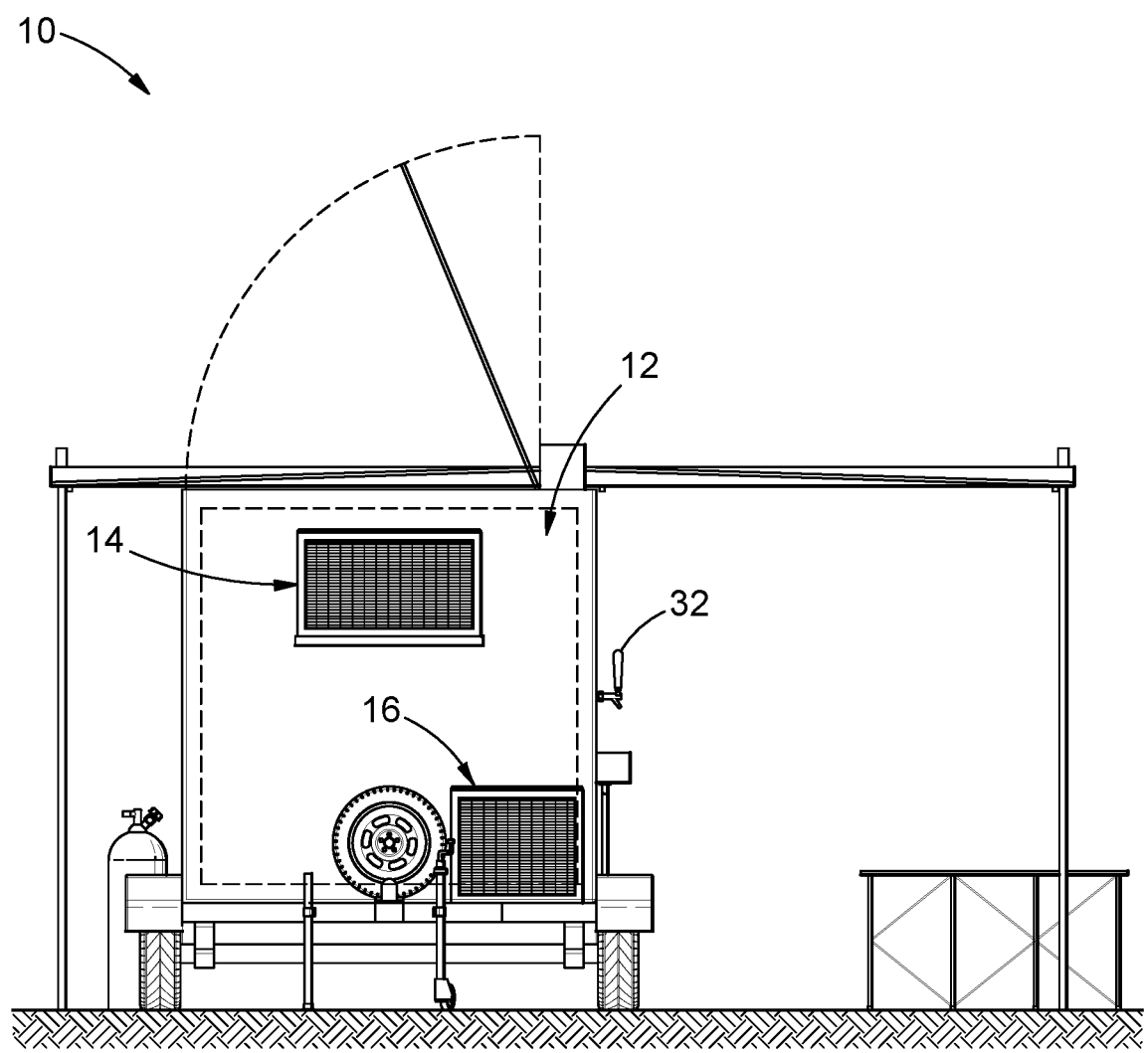
FIG. 2 shows a front view of an embodiment of the mobile refrigerated bar unit.
Figure 3:
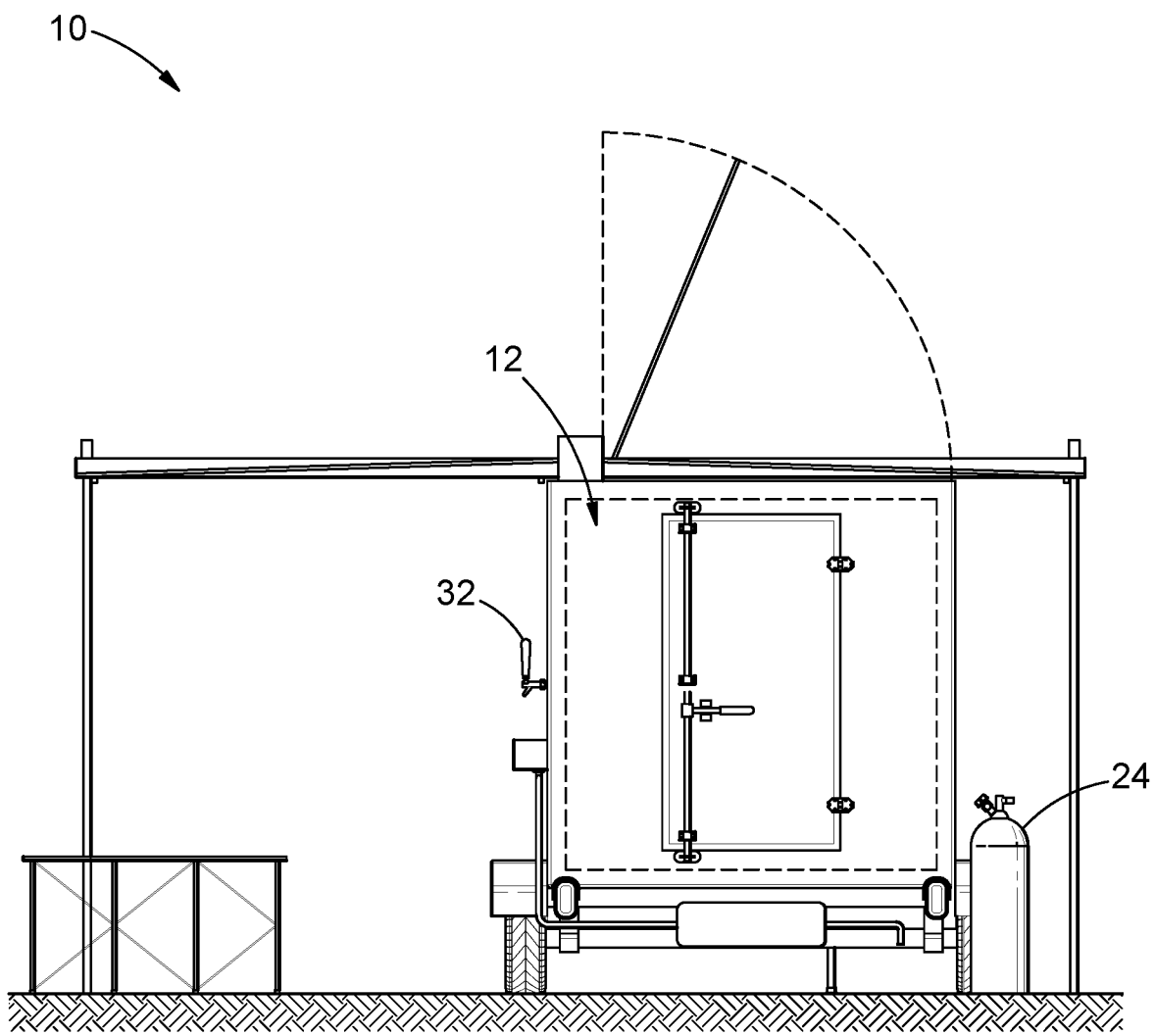
FIG. 3 shows a further back view of an embodiment of the mobile refrigerated bar unit.
Figure 4:
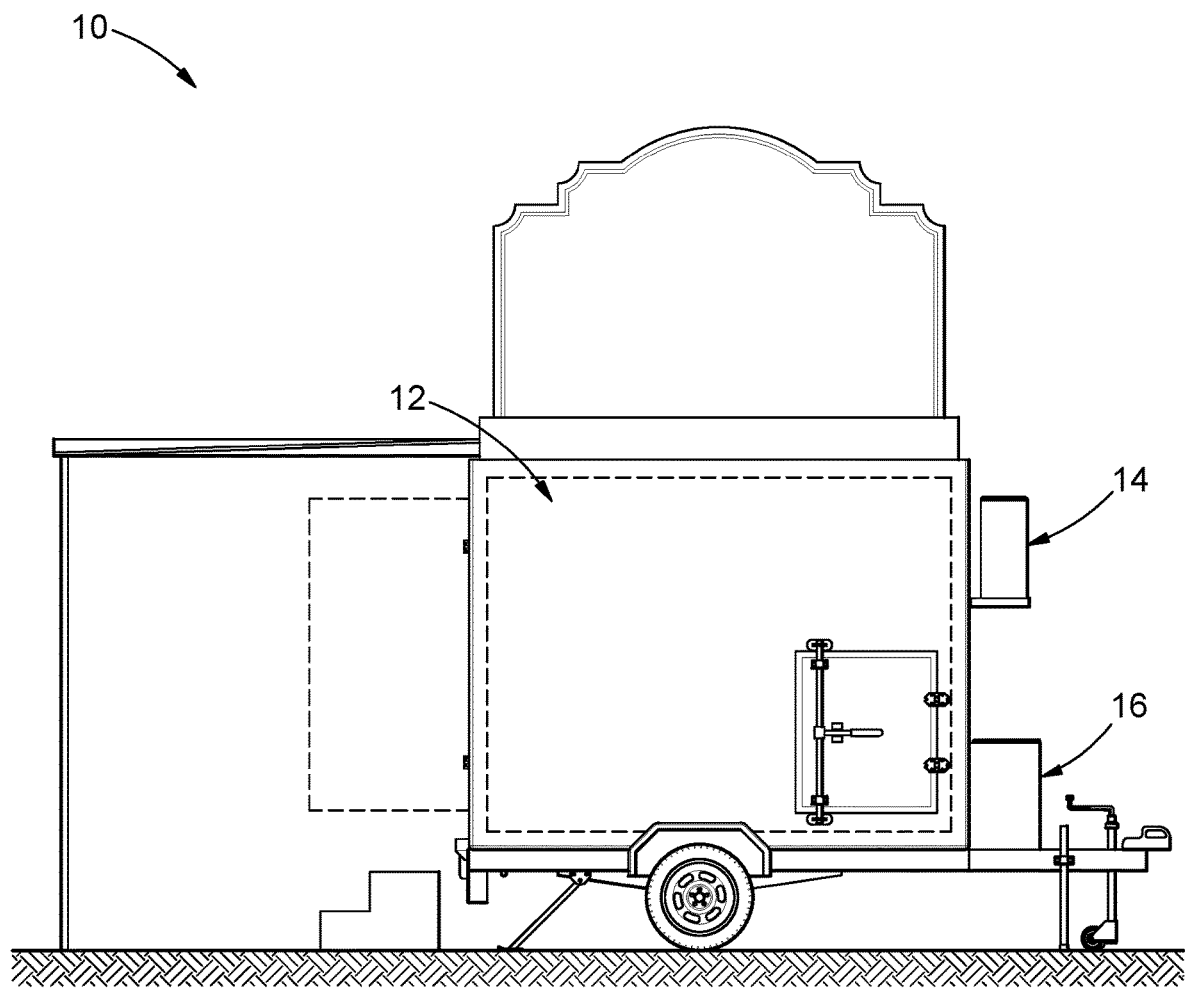
FIG. 4 shows a further side view of an embodiment of the mobile refrigerated bar unit.
Figure 5:
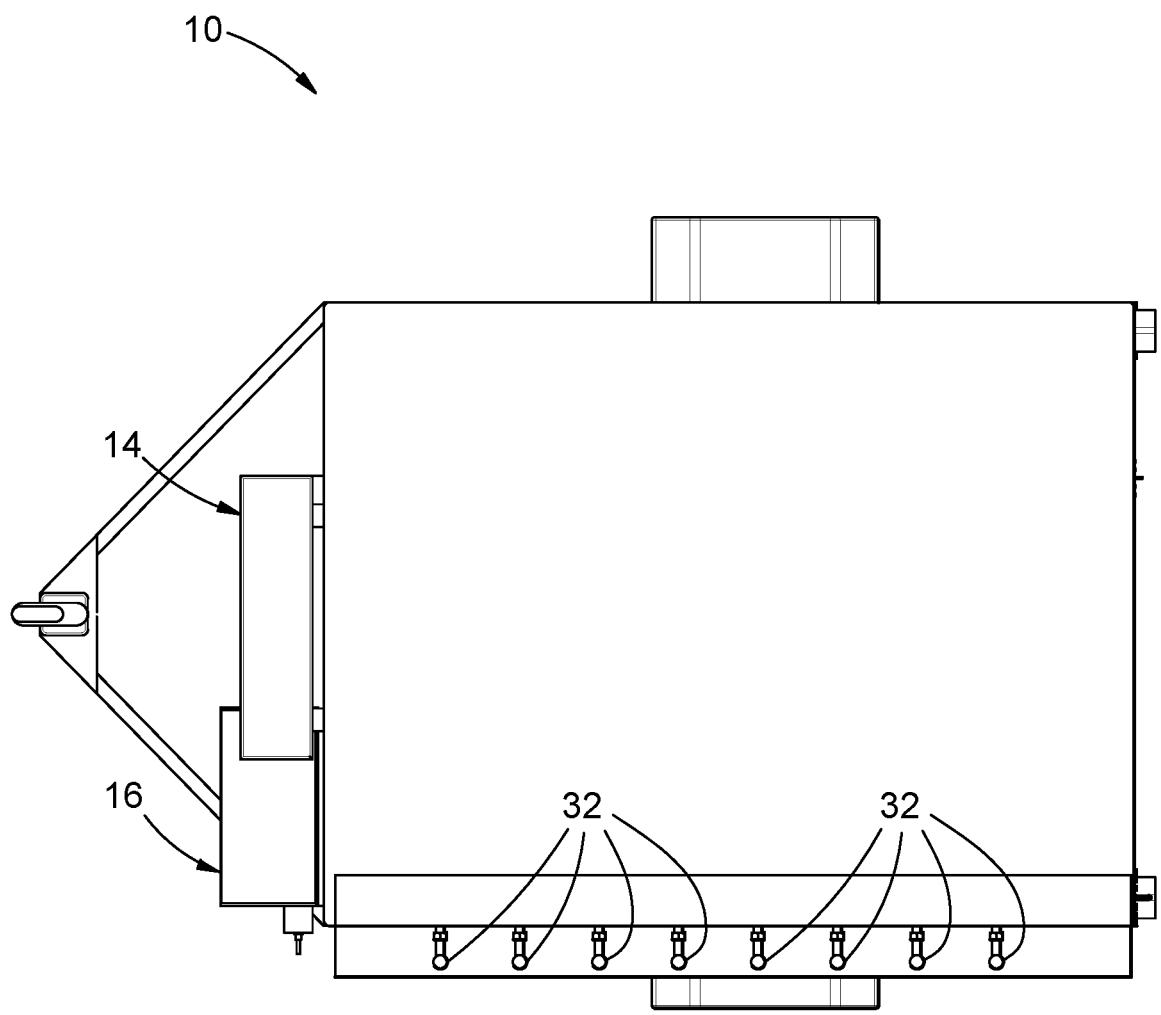
FIG. 5 shows a top view of an embodiment of the mobile refrigerated bar unit.
Figure 6:
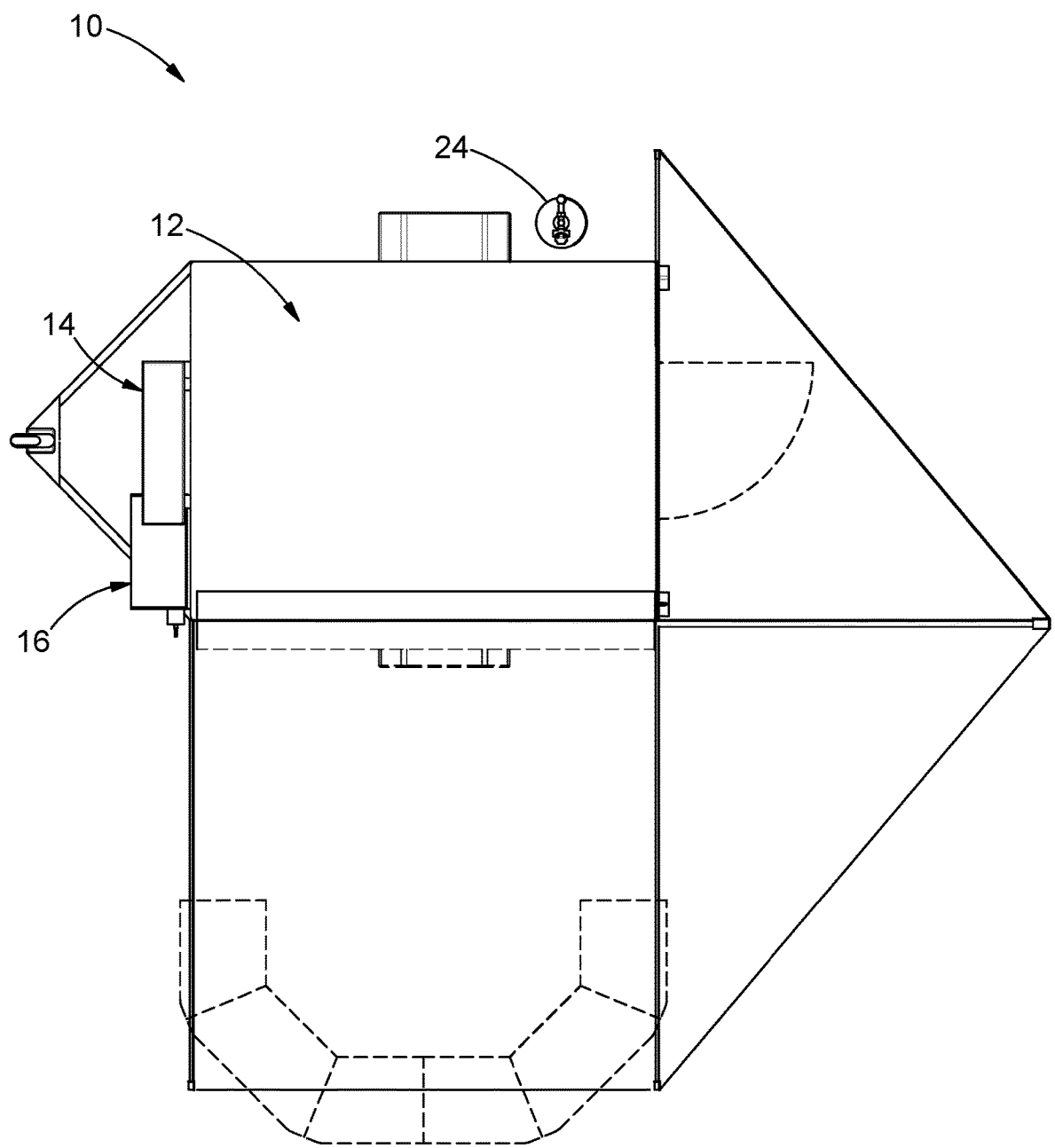
FIG. 6 shows a top view of a further embodiment of the mobile refrigerated bar unit.
Figure 7:
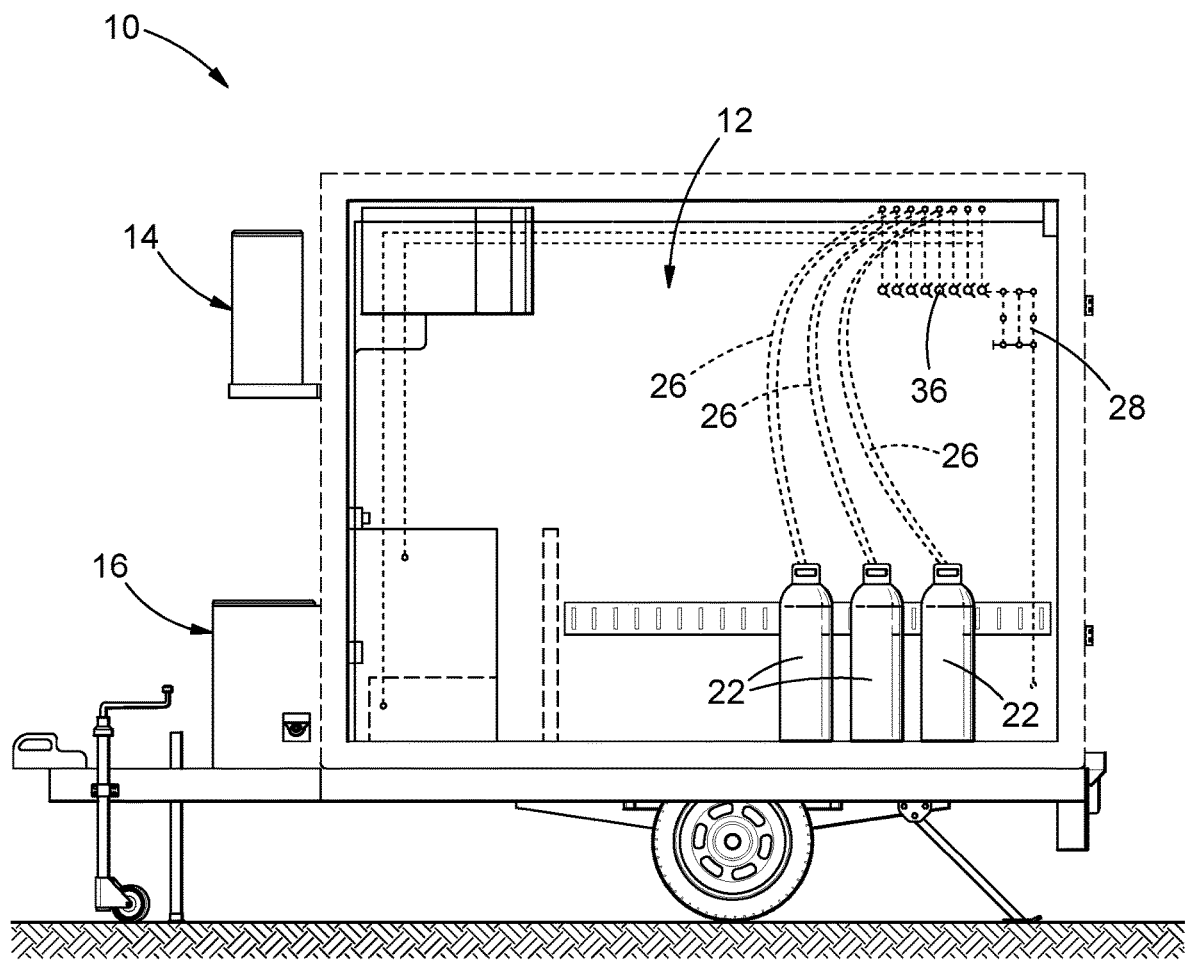
FIG. 7 shows a cross-sectional side view of an embodiment of the mobile refrigerated bar unit.
Figure 8:
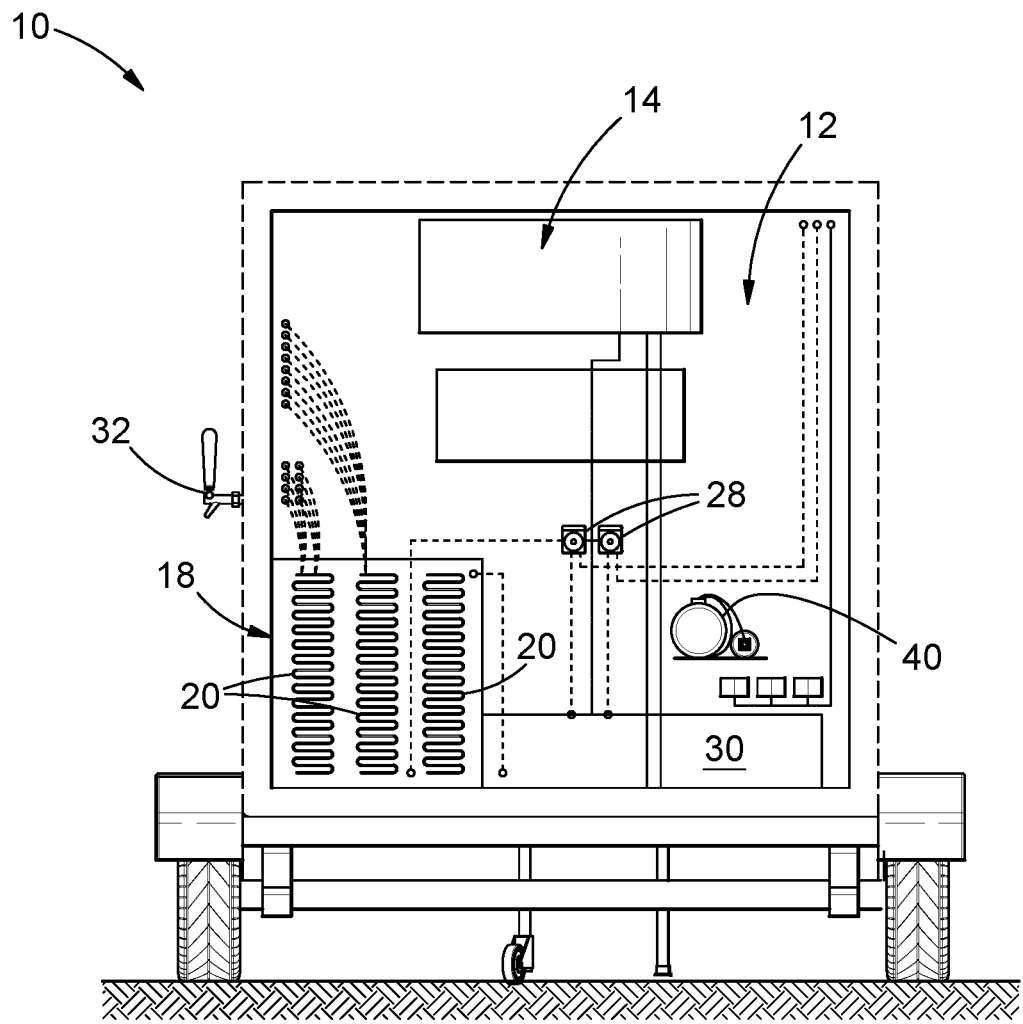
FIG. 8 shows a cross-sectional back view of an embodiment of the mobile refrigerated bar unit.
Figure 9:
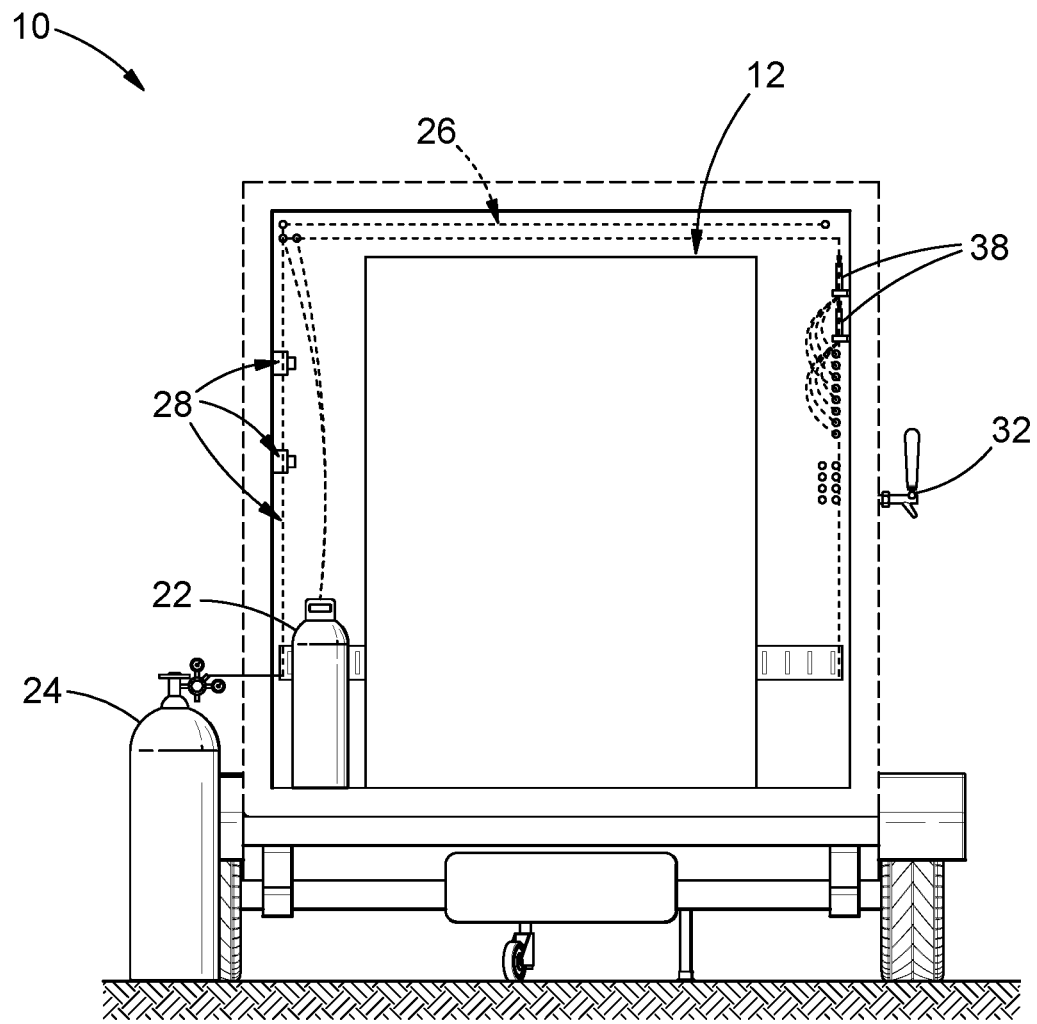
FIG. 9 shows a cross-sectional back view of an embodiment of the mobile refrigerated bar unit.

Reference numeral 10 shall refer to a mobile refrigerated bar unit in accordance with the invention.

Figure 10:
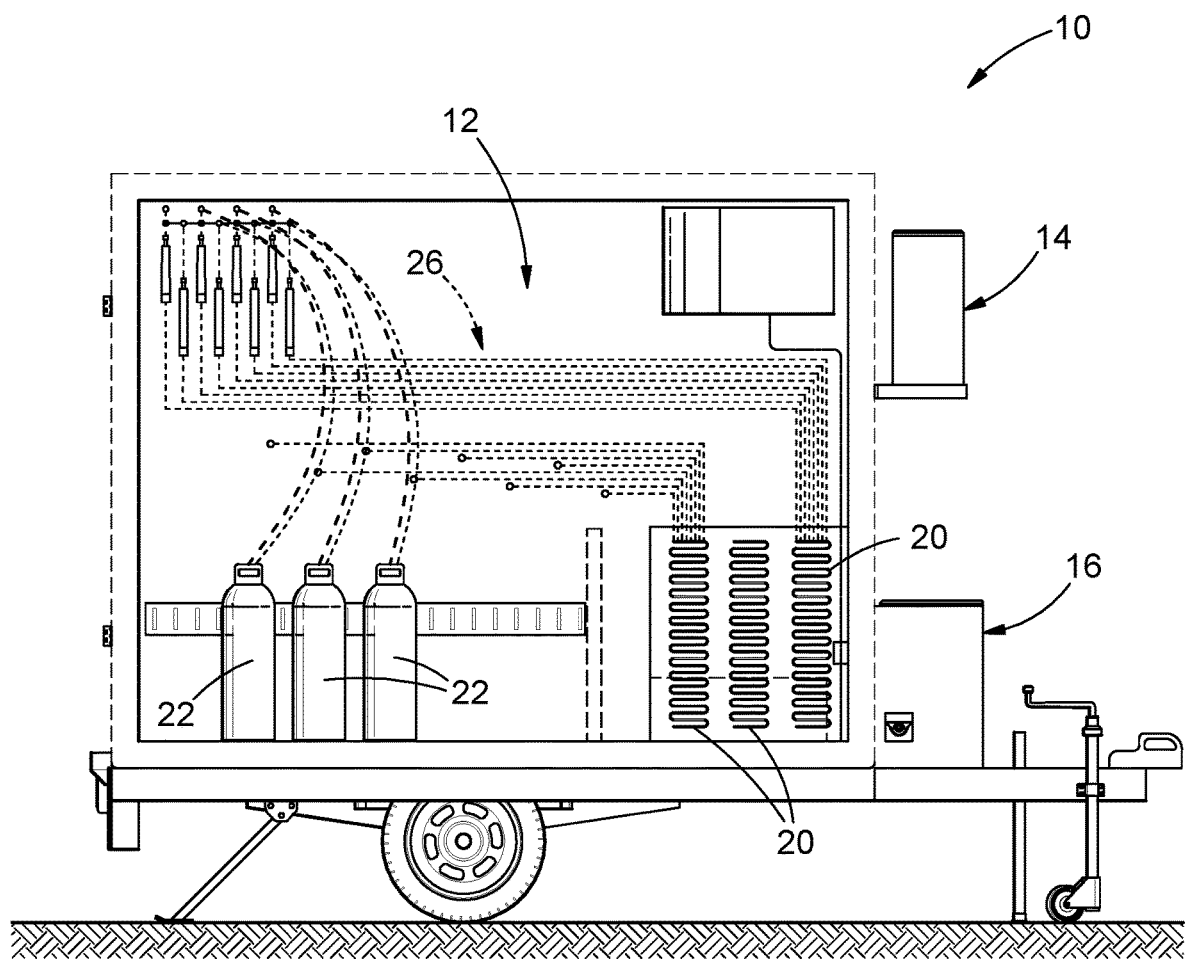
FIG. 10 shows a further cross-sectional side view of an embodiment of the mobile refrigerated bar unit.

A mobile refrigerated bar unit (10), including a container (12) for storage of products (kegs are shown in FIG. 10), a temperature conditioning means (14) assisting in maintaining a pre-set ambient temperature inside the container (12), a secondary temperature control mechanism (16) for control of the temperature of the products; and a pressure system (28), that controls the water in the secondary temperature control mechanism (16). The mobile refrigerated bar unit (10) is powered by various means, but typically by solar power, battery, generator/inverter and/or an electrical power point.

The container (12) is a refrigeration container, typically of a rectangular shape and suitable for storage of products at a cool temperature, namely beverages. The container (10) is manufactured to a size adequate for the needs of the user, typically from insulated panels of a thickness of approximately 7 cm. The container (12) is configured to attach to a trailer which allows for the transportation of the mobile refrigeration unit (10) to various destinations or various terrains. The mobile refrigerated bar ur it (10) can be transported to any destination, notwithstanding the rough terrain.

The container (10) has a door which allows for access to pack the container (10), typically securing the products inside the container (12) for safe transport thereof; to perform maintenance, to operate the pressure system and the like. The container (10) defines at least on further sealable aperture for access to the temperature conditioning means (14) and the secondary temperature control mechanism (16).

The container (12) is temperature controlled by a temperature conditioning means (14) that sets a temperature inside the container (12), thereby allowing the stored products to be cooled during use and prior to use and maintaining the temperature of the container (12) at a pre-set temperature, typically of a temperature below 15 degrees Celsius, notwithstanding the temperature outside of the container (12). Ideally, the temperature is at 6 degrees Celsius.

The secondary temperature control mechanism (16) includes a split system. That split system includes a compressor, condenser and thermostat mounted on the outside of the container (12), which are in communication with a cooling coil (20).

The secondary temperature control mechanism (16) includes a split system. The split system includes a compressor, condenser and thermostat mounted on the outside of the container (12), which are in communication with a chilling unit mounted on the inside of the container. The secondary temperature control mechanism (16) also includes a water tank (18) which is located on the inside of the container (12), the water tank (18) including at least one refrigeration coil (20) through which products are pumped and the temperature thereof measured by the thermostat which assists in controlling and maintaining the temperature of the cold water in the water tank (18), which holds about 50 litres of water. Typically there are 8 stainless steel refrigeration coils (20) of approximately 9.5-14 meters in length.

Figure 11:
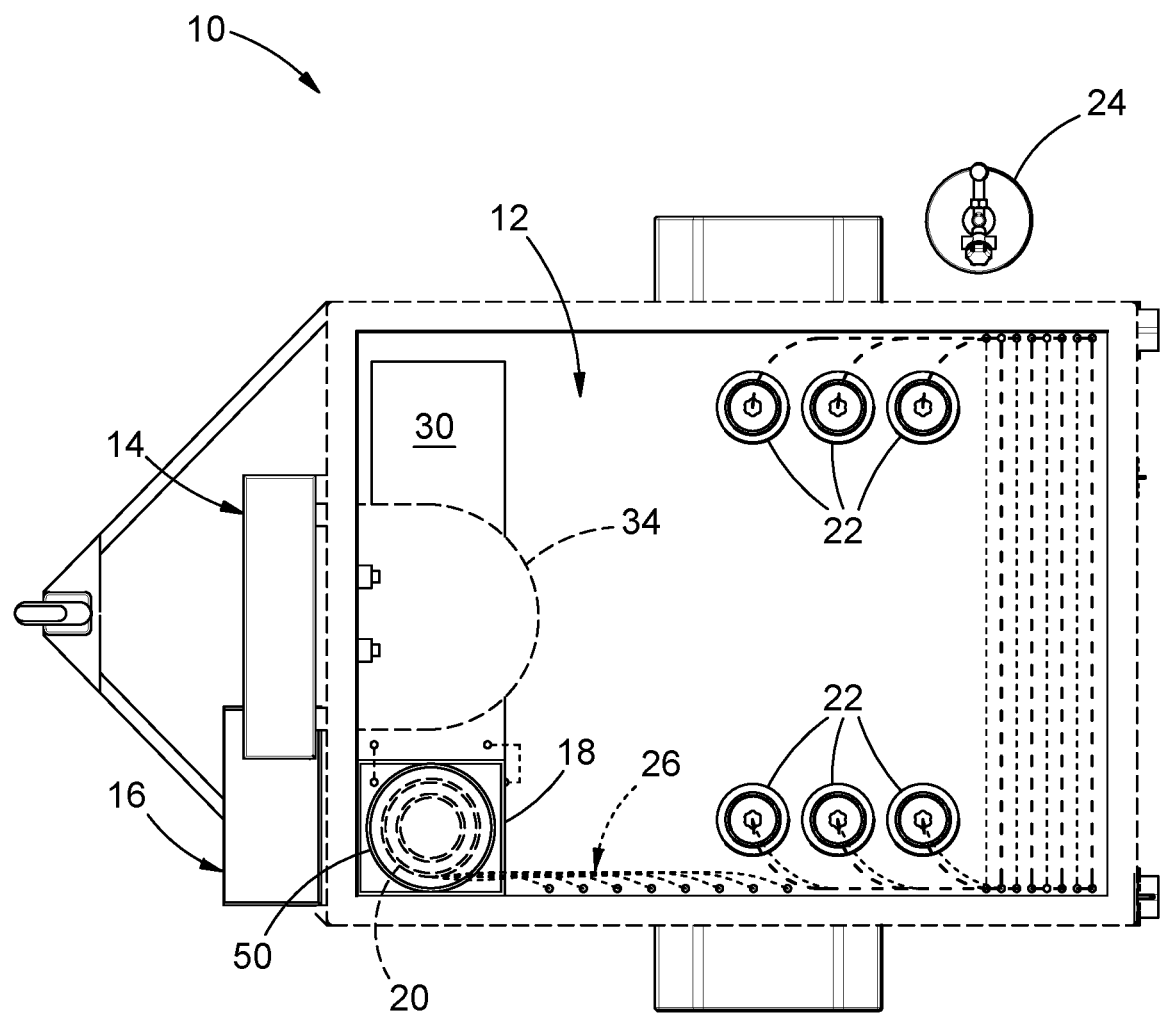
FIG. 11 shows a cross-sectional top view of an embodiment of the mobile refrigerated bar unit.

The products (beverages) flow from beverage storage means (22), through beverage dispensing lines (26) and run through the refrigeration coils (20), the beverages cooled to a temperature of approximately 2-3 degrees Celsius when flowing through the refrigeration coils (20). In FIG. 11, the refrigeration coils (20) will be seen to be encompassed fully within (outer) cooling coils (50). It will be appreciated by the expert in the field that, by passing a refrigerant through cooling coils (50), any beverage flowing through refrigeration coils (20) will necessarily be cooled, too.

The water tank (18) includes an ice bank (not shown) which is monitored by a thermostat, the thermostat monitoring the temperature of the water and assisting in ensuring the water a temperature just above freezing, and avoiding the increasing of the size of the formation of an ice bank around the refrigeration coils. A pump (not shown) is also present in the water tank (18), firstly, to agitate the water and thereby assisting in preventing the formation of ice around the refrigeration coils (20), and secondly to assist with circulating water along the beverage dispensing lines (26) extending from the refrigeration coils (20).

Water from the water tank (18) is pumped from the water tank (18), adjacent to the beverage dispensing lines (26), thereby maintaining the temperature of the beverages before dispensing.

The control of the ambient temperature in the container (12) and the secondary temperature control mechanism (16) assist in alleviating strain on the secondary split system; ensuring that the beverages being dispensed remain at the same temperature through use; reducing waste of stored product and lengthen the life span of the product.

The pressure system (28), typically powered by a gas tank (24) external the container (12), provides for, firstly the draining of water from the water tank (18) into the storage tank (30) and secondly, the repumping of water back into the water tank (18). The pressure system (28) is typically controlled by a compressed gas system, namely Carbon Dioxide gas, sourced from a tank outside of the container (12) to which two pumps are associated and valves controlling the gas expelled from the pumps. The valves are located inside of the container (12) and control the carbon dioxide travelling through the pipes extending from the pumps.

A purpose of the pressure system (28) is to store the cool water in the storage tank (30) during transport of the mobile refrigeration unit.

The first pump enables water to be pumped water from the water tank (18), to a storage tank (30) located adjacent to the water tank (18). Manipulation of the valve of the first pump from a first closed position to a second open position activates the pump, thereby pumping water from the water tank (18) to the storage tank (30). Manipulation of the valve of the first pump from a second open position to a first closed position stops of the pumping of water.

Removing the water from the water tank (18) allows for maintenance of the secondary split system without removing the split system from the container (12) and, furthermore, assists in preventing of the freezing of water in the water tank (18). The removal of the water from the water tank (18) assists in preventing damages to the pump and other equipment while in transit and, furthermore, preventing spillage of water from the water tank. Storing the water in a storage tank inside the refrigerated container allows the water to keep at a low temperature for immediate use at the next location.

The second pump enables pumping of the water from the storage tank (30) to the water tank (18). Manipulation of the valve of the second pump, from a first closed position to a second open position, activates the pump, thereby assisting in pumping water from the storage tank (30) to the water tank (18), for cooling. Manipulation of the valve of the second pump from a second open position to a first closed position, stops the pumping of water. The water tank has an overflow positioned at the maximum level of the water tank flowing back into the storage tank (30).

Pumping of water from the storage tank (30) to the water tank (18) is after transport of the mobile refrigeration unit and before set up of the mobile refrigerated bar unit, for cooling of the water by the secondary split system, and the subsequent cooling of the dispensed products.

Once cooled, the products are pumped from the product storage means (22) through the beverages dispensing lines to the dispensing means (32), situated on the wall of the mobile refrigeration unit, namely taps and or bottle filling units. Typically there are 8 taps and/or bottle filling units.

Generally, the mobile refrigeration unit includes a plurality of detectors (38), typically FOB ('foam on beverage') detectors, which detect the foam on beverages, typically beer, stored in the storage means (22) inside the container (12). Furthermore, the mobile refrigeration unit includes at least one regulator (36) which controls and manages dispensing pressure of the product. The regulators (36) are carbon dioxide regulators associated with each beverage dispensing line (26) and assisting in managing and controlling the dispensing pressure from the storage means, through the beverage dispensing line (26) and the refrigeration coils (20), to the dispenser (32).

In an embodiment of the invention, the mobile refrigerated bar unit (10) includes a software controlled Dispense Monitoring System (not shown) including flow meters, temperature meters and cameras (not shown). This monitoring system includes integration into a POS (point of sale) system for the monitoring of the sales versus usage. The monitoring system is typically accessible from a remote location via a mobile application.

In an embodiment of the invention, the mobile refrigeration unit (10) includes a carbonation unit (40) used to carbonate a beverage, and associated with one or more of the beverage dispensing lines (26).

The carbonation unit (40) includes a tank, which is manufactured of stainless steel, and configured to handle high pressures, connected to carbon dioxide bottle and a regulator. The beverage to be carbonated is fed into the tank, and the carbon dioxide is introduced to produce a carbonated beverage at a pressure of between 6-8 bar. The tank of the carbonation unit is fed into a beverage dispensing line and the beverage cooled, as per the normal course.

The invention claimed is:

1. A mobile refrigeration unit for dispensing beverage products from beverage storage means, the mobile refrigeration unit including
    a container for the storage of the beverage storage means containing the beverage products;
    dispensing lines for connecting the beverage storage means to beverage dispensing means located on the outside of the container from which the beverage products are dispensed in use;
    a temperature conditioning means for maintaining a preset ambient temperature inside the container, the temperature conditioning means being a split system including a compressor and a condenser mounted on the outside of the container and an evaporator blower mounted on the inside of the container, wherein the evaporator is in communication with a thermostat for maintaining the temperature inside the container at a selected temperature; and
    a secondary temperature control mechanism for controlling the temperature of the beverage products in the dispensing lines prior to being dispensed from the dispensing means, the secondary temperature control mechanism being a split system including a compressor and a condenser mounted on the outside of the container and a chilling unit located on the inside of the container, wherein the chilling unit includes a water tank and a cooling coil mounted inside the water tank, the chilling unit being in communication with a thermostat for monitoring and controlling the temperature of water inside the water tank,
    wherein the dispensing lines include refrigeration coils located within the cooling coil in the water tank such that the beverage products are cooled when flowing through the refrigeration coils before reaching the dispensing means; and
    a pressure system for controlling the water level in the water tank, the pressure system including a storage tank located inside the refrigerated container and at least one pressure operated pump configured to pump water from the water tank to the storage tank and alternatively from the storage tank to the water tank, as required, thereby allowing cold water to be stored in the storage tank during transportation of the mobile refrigeration unit and to be available for immediate use after transportation.

2. A mobile refrigeration unit according to claim 1, wherein the refrigeration coils are encompassed within the cooling coil.

3. A mobile refrigeration unit according to claim 1, wherein the water tank includes an ice bank which is controlled by the thermostat in communication with the chilling unit, the thermostat monitoring the temperature of the water and assisting in ensuring the water is a temperature just above freezing, thereby avoiding the increasing of the size of the ice bank in the water tank, alternatively from forming around the refrigeration coils.

4. A mobile refrigeration unit according to claim 3, wherein the beverage products are cooled to 2° C.-3° C. when flowing through the refrigeration coils.

5. A mobile refrigeration unit according to claim 1, wherein the pressure system includes two pressure operated pumps and associated valves.

6. A mobile refrigeration unit according to claim 1, wherein the pressure system is powered by a means selected from the group consisting of: electrical means, compressed gas, such as CO2 gas, air, and a combination of these.

7. A mobile refrigeration unit according to claim 6, wherein the pressure system further includes at least one gas tank.

8. A mobile refrigeration unit according to claim 1, wherein the water tank also includes a water pump for agitating water in the water tank to avoid the freezing of the water around the refrigeration coils and for circulating water along the beverage dispensing lines extending from the refrigeration coils.

9. A mobile refrigeration unit according to claim 1, wherein each dispensing line has a refrigeration coil located in the chilling unit and each dispensing line is in fluid connection with a dispensing means.

10. A mobile refrigeration unit according to claim 1, including a plurality of detectors located in the dispensing lines to detect the presence of foam in the beverage products in the dispending lines.

11. A mobile refrigeration unit according to claim 1, including regulators for regulating the dispensing pressure of the beverage products.

12. A mobile refrigeration unit according to claim 11, wherein each beverage dispensing line has a regulator to assist in managing and controlling the dispensing pressure from the storage means, through the beverage dispensing line and the refrigeration coils to the dispensing means.

13. A mobile refrigeration unit according to claim 1, including a software controlled dispense monitoring system, wherein the system includes flow meters, temperature meters and cameras.

14. A mobile refrigeration unit according to claim 13, wherein the dispense monitoring system is integrable to a point-of-sale system.

15. A mobile refrigeration unit according to claim 1, including a carbonation unit for carbonating a beverage product, the carbonation unit including:
    a dispensing line, through which the beverage product is dispensed;
    a tank for storing a carbonation agent; and
    a regulator for regulating the pressure within the tank.

16. A mobile refrigeration unit according to claim 15, wherein the carbonation agent is CO2 gas.

17. A mobile refrigeration unit according to claim 15, wherein the pressure in the carbonation unit is maintained between 6 and 8 bar.

18. A mobile refrigeration unit according to claim 1, wherein the storage means takes the form of a keg.

19. A mobile refrigeration unit according to claim 18, wherein the dispensing means takes the form of taps.

20. A mobile refrigeration unit according to claim 19, wherein one keg is connected in fluid communication with two or more taps.

* * * * *